April 30, 1957 P. F. M. GLOESS 2,790,599

ELECTRONIC DIGITAL ADDER AND MULTIPLIER

Filed Feb. 25, 1952 4 Sheets-Sheet 1

INVENTOR.
PAUL FRANÇOIS MARIE GLOESS

Theodore Haber

ATTORNEY

April 30, 1957 P. F. M. GLOESS 2,790,599

ELECTRONIC DIGITAL ADDER AND MULTIPLIER

Filed Feb. 25, 1952 4 Sheets-Sheet 2

INVENTOR.
PAUL FRANÇOIS MARIE GLOESS

ATTORNEY

INVENTOR.
PAUL FRANÇOIS MARIE GLOESS

ATTORNEY

INVENTOR.
PAUL FRANÇOIS MARIE GLOESS

ATTORNEY

United States Patent Office 2,790,599

Patented Apr. 30, 1957

2,790,599

ELECTRONIC DIGITAL ADDER AND MULTIPLIER

Paul Francois Marie Gloess, Paris, France, assignor to Societe d'Electronique et d'Automatisme, Courbevoie, France Application February 25, 1952, Serial No. 273,211

Claims priority, application France February 27, 1951

37 Claims. (Cl. 235—61)

The present invention relates to electronic digital computers of the kind in which usual arithmetical operations such as additions and multiplications of numerical quantities are performed by mixing or combining according to a predetermined program of operation, trains of electric pulses which are encoded in accordance with the usual denary radix system of numeration. In a coded train of this kind, each digital value, from 0 to 9, of the successive decimal figures of a numerical quantity, arranged in ascending powers of the radix 10 is represented by the pulse configuration of a predetermined and constant time interval, which will herein be called a decade and which comprises ten equal moments of code arranged in the ascending digital values of the decimal figures. Any digital value, from 0 to 9, of a decimal figure can be represented either by means of a single pulse positioned at the corresponding moment of code in the decade concerned, or by means of pulses in a number equal to said digital value and distributed within said decade at time intervals not higher than that of the said moments of code.

In a program-controlled computer of the kind specified in the foregoing, time intervals allotted to decades are marked by program pulses which define the minor cycles of the computer; a predetermined number of such minor cycles constitute a major cycle of computation, and clock or timing pulses are also provided by the program circuits so as to mark the moments of code within each decade. The time interval of a minor cycle will herein be denoted $\tau$, and the time interval of a moment of code will be denoted $\theta=\tau/10$.

It is to be noted that the conversion from a time position code to a pulse number code can be obtained by simple means (which will be described later), so that, in a denary-radix computation device, the true operator circuits may be so designed that they handle pulse number coded trains even if these trains are to be derived from time position code trains before entering said operator circuits, and the result trains are to be converted into time position code trains for further use in the computer transmission circuits.

It is an object of the invention to provide improved computer operator circuits which insure the execution of arithmetical operations by mixing number coded pulse trains, in accordance with the program adapted to the kind of operation, i. e., addition or multiplication.

It is a further object of the invention to provide in such computer operator circuits improved carry-over means for converting any gross result of mixing into a net result, viz. a coded train of electric pulses which represents the correct result of any addition, final or partial, with all carries effected from one decimal term to the following throughout the numerical quantity representing said result of addition.

It is to be noted here that, from a general point of view, any carry-over circuit can be also considered as an encoder proper and, in the circuits which will be described more specifically, such an encoding can be plainly used for converting an aperiodically formed series of electric pulses into a coded train representing, in the code referred to, the numerical quantity measuring the number of pulses in said aperiodic series.

These and other objects of the invention will be more fully described in the annexed drawings, in which Fig. 1 shows a diagram of pulses defining, by means of illustrative numerical examples, the above referred kinds of numerical quantity representations which are to be used for carrying out the present invention.

Fig. 2 exemplifies a circuit for converting a time position pulse coded train into a pulse number coded train.

Figure 6:
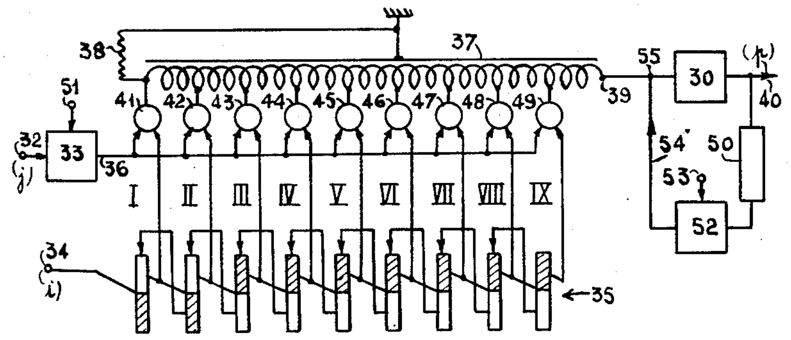
Fig. 6 shows a circuit for realizing an operation in accordance with the diagram of Fig. 5 but with the omission of program circuits.
Figures 7, 8:
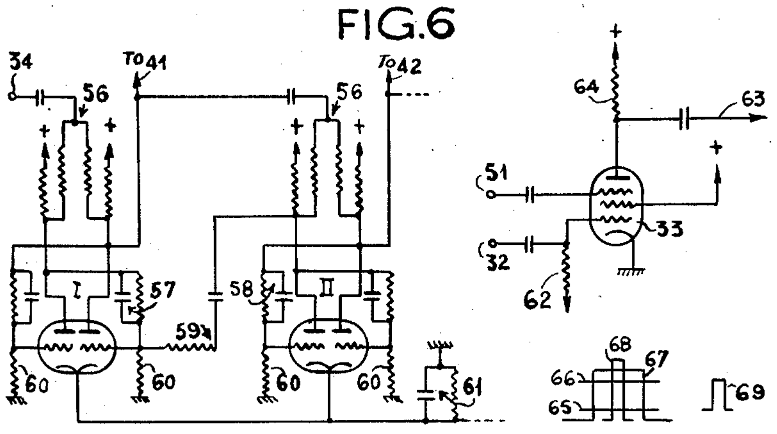

Figs. 7 and 8 give details of two component circuits of Fig. 6.

Figure 4:
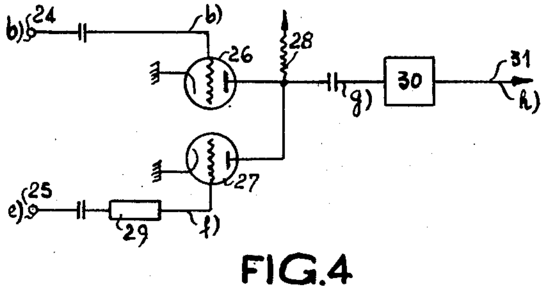
Fig. 4 shows a circuit for realizing an operation in accordance with the diagram of Fig. 3.
Figure 9:
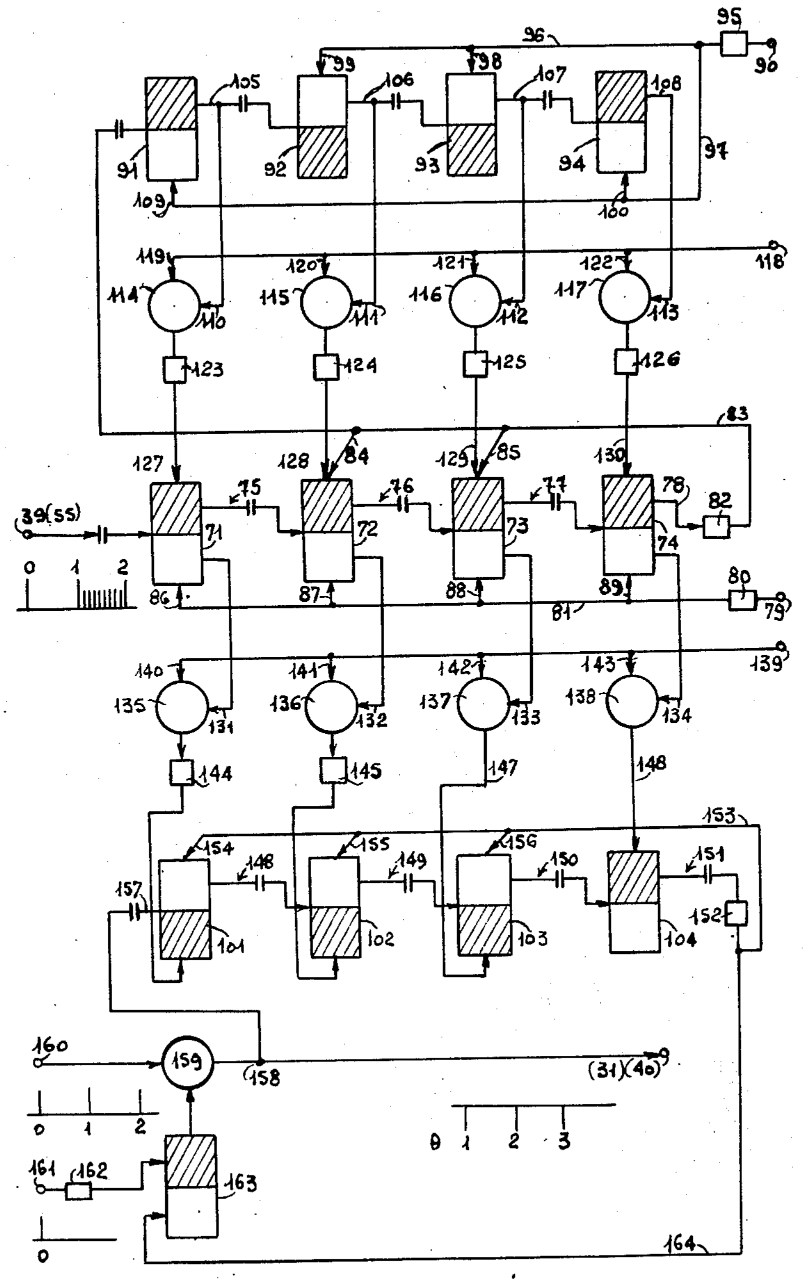

Fig. 9 shows the carry-over arrangement to be inserted, according to the invention, in the adding and multiplying circuits of Figs. 4 and 6.

Figure 10:
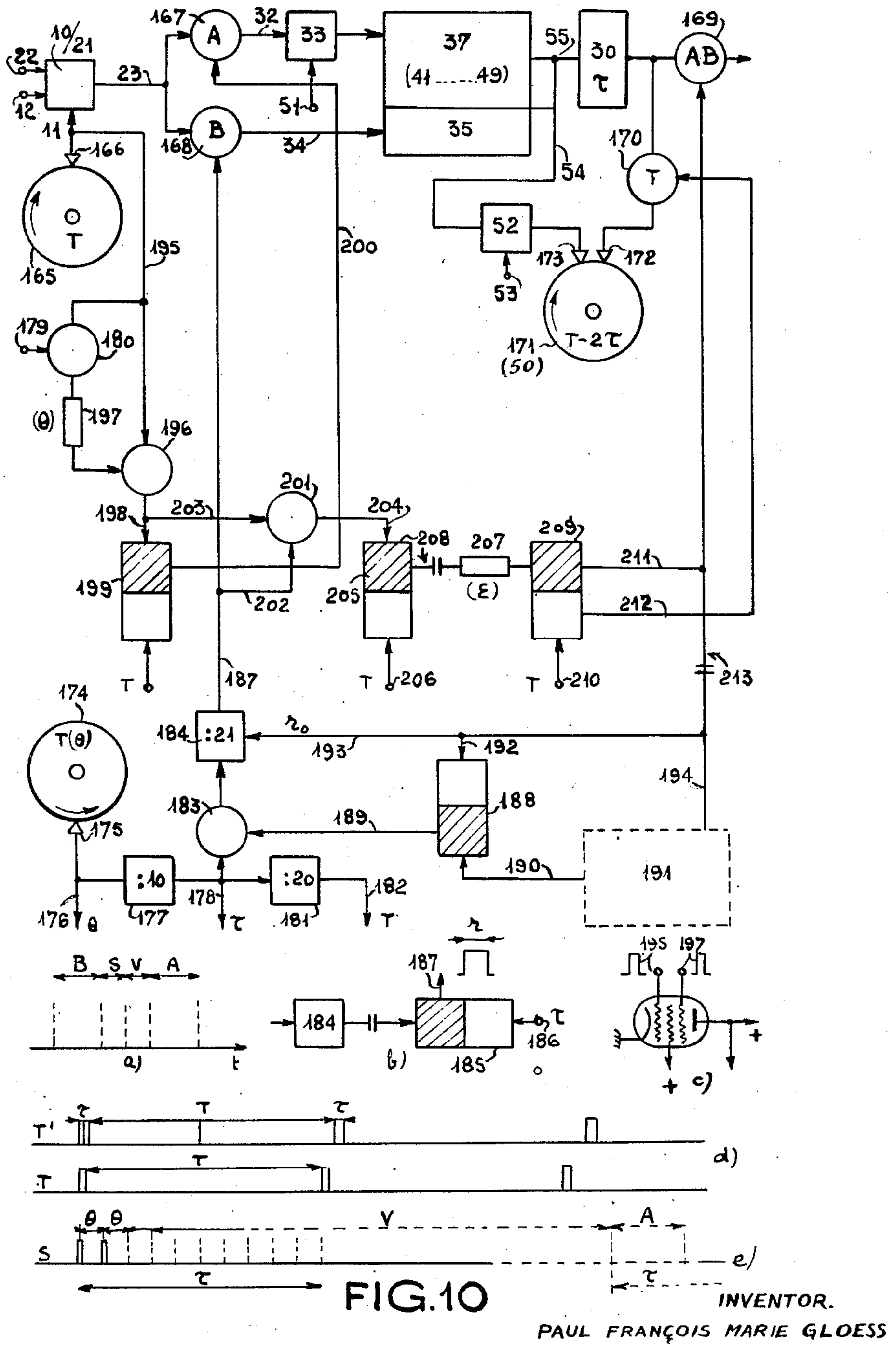

Fig. 10 illustrates an arrangement of a complete multiplying computer including a multiplication program circuit which comprises components forming part of certain computer machines.

Figure 1:
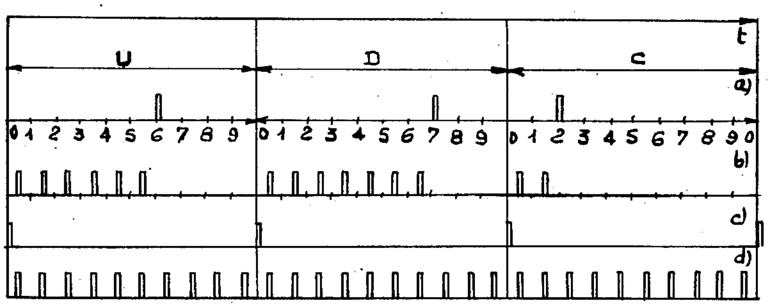

Referring first to Fig. 1, the representation of a numerical quantity. For example 276 in decimal writing is given as a function of time and consists of three decades, U, D, C, thus covering three minor cycles of the computer. In each decade ten moments of code are indicated, from 0 to 9. The electrical representation of the numerical quantity 276 is given in time position pulse code on line *a*) of Fig. 1, wherein points 0, 1, 2 . . . 9 define the ten places of pulses within each decade. Thus the numerical quantity 276 is written in the presence of a pulse at place 6 of the unit decade U, of a pulse place 7 of the tens decade D, and of a pulse at place 2 of the hundreds decade C, in this succession in time (the decades are arranged with respect to the ascending powers of 10). The time axis $t$ is indicated at the upper part of Fig. 1.

Line *b*) shows the other representation of the numerical quantity 276, when using a pulse number code. Six pulses are present in decade U, seven pulses in decade D and two in decade C.

For converting the electrical representation *a*) into the electrical conversion *b*), it is useful to dispose of the two series of pulses shown in lines *c*) and *d*) of Fig. 1. The series in line *c*) carries a pulse at each zero place of a decade. It is the above referred minor cycle program pulse series. The series of pulses in line *d*) comprises ten equidistant pulses defining the ten moments or pulse periods of code in a decade. It is the clock or timing pulse series of the computer code moment or pulse period being defined as time interval during which at least one code pulse can exist. Such marking pulses are permanently generated and distributed in computers of the kind specified.

Figure 2:
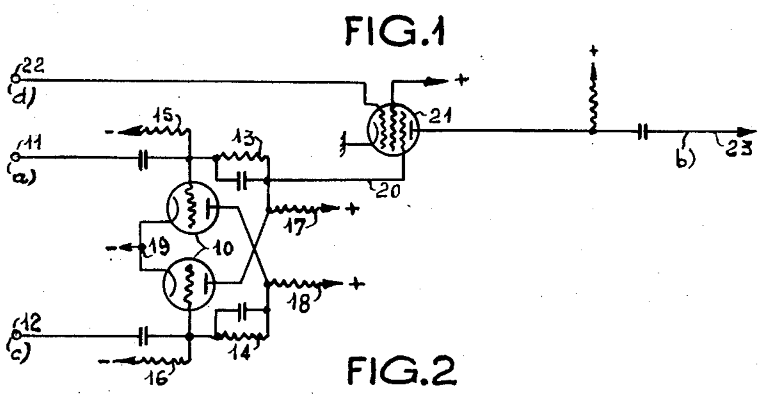

The electrical conversion from representation *a*) to representation *b*) can easily be performed, as shown in Fig. 2, by means of a gate 21 receiving on its control grid the program pulses *d*) applied at terminal 22 and controlled by its suppressor grid by means of a bi-stable trigger stage 10 through the D. C. connection 20 between suppressor grid and a plate of one of the paired triodes of the trigger stage 10. When this triode is off, gate 21 will pass the applied pulses *d*) and when this same triode is on, gate 21 will not pass these pulses to the output 23.

The bistable trigger stage 10 may be designed in any one of the well-known schemes. It consists for example of two tubes, for instance triodes, reciprocally coupled by time constant networks 13 and 14, such as resistor shunted by a capacitor from the plate of one tube to the control grid of the other; the cathodes are biassed by a common connection 19; the grids are individually biassed as indicated at 15 and 16; separate plate resistors 17 and 18 are provided.

Such a trigger stage is actuated by separate grid inputs: at 11, the coded train is applied in its representation *a*), time position code, of the numerical quantity to be transferred; at 12, the program pulses *c*) are applied. Both *a*) and *c*) pulses are applied, for instance, in negative polarity, so as to switch off the tube they reach if this tube was on, and to have no effect upon this tube if it was off.

The rest condition of trigger stage 10 is the one in which the tube, the control grid of which is connected to input terminal 12, is on. In this rest condition, gate 21 is off; no clock pulse can pass through it. When a conversion operation occurs, both trains *a*) and *c*) are applied simultaneously on their respective input terminals 11 and 12. Terminal 22 may permanently receive the clock pulse *d*). When the first minor cycle pulse *c*) reaches the control grid of the lower tube, at the beginning of the (0) moment of code of the first minor cycle, the units U minor cycle, this tube is switched off and the trigger stage is rocked to its work position wherein the gate 21 is unblocked (or on). The clock pulses *d*), which lag slightly behind the beginning of the moments of code proper (such phase lag being obtained in their application on terminal 22), begin to pass through gate 21 to output connection 23. When the unit pulse in *a*) reaches input terminal 11, at the beginning of the seventh moment of code of the decade, since these moments are denoted from zero to nine, the trigger stage 10 is rocked back to its rest condition, stopping the passage of the clock pulses through gate 21. Meanwhile in the time interval between the minor cycle pulse and the unit digital pulse, gate 21 has given six clock pulses free access to output connection 23; thus, for the first decade, the pulse configuration is such as indicated at U–*b*) in Fig. 1. At the beginning of the second minor cycle, corresponding to the D digit decade, the minor cycle pulse *c*) acts again to set the trigger stage to work, hence to unblock gate 21, seven clock pulses will be transmitted to the output before the tens digital pulse at *a*) resets trigger stage 10 and again closes gate 21, in accordance with Fig. 1; the same will occur for the third decade C, and so forth as long as there exist decades in the coded train applied at *a*). When the last significant decade of the coded train has ended, minor cycle pulses are no longer applied at *c*) under the control of the program circuits of the computer, and the gate stage 21 remains off. If two pulses were simultaneously applied at 11 and at 12, the trigger stage 10, for instance, will not rock, if required, by imparting a greater negative amplitude to the *c*) pulses than to the *a*) pulses.

In this way a simple circuit of the kind shown and described will convert a coded train of the *a*) representation, when applied at 11, into a coded train of the *b*) representation at output connection 23.

Figure 3:
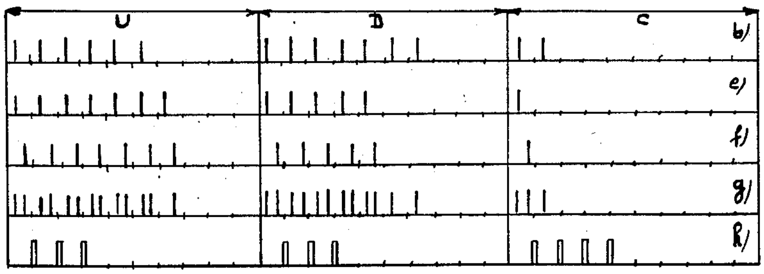
Fig. 3 shows a diagram of pulses illustrating an example of addition of two numerical quantities in accordance with the invention.

Fig. 3 shows two number coded pulse trains, one of them having the same configuration as previously shown at *b*) in Fig. 1, and representing the numerical quantity 276; the other is of the configuration shown at *e*), Fig. 3, and represents the numerical quantity 157; an addition of these numerical quantities is performed as follows, in accordance with the present invention:

One of the incoming coded trains, *e*) for instance, is shifted or delayed by a time interval shorter than the length of a moment of code, and is thus converted into the coded train shown at *f*), Fig. 3. Then both these relatively shifted coded trains *b*) and *f*) are mixed resulting in an output train of pulses having the representation *g*). The number of pulses in the decades of train *g*) is the sum of the number of pulses in the corresponding decades of trains *b*) and *f*). In the units decade U 13 pulses are present, 6 plus 7; in the tens decade D, 12 pulses are present, 5 plus 7; in the hundreds decade C, 3 pulses are present, 2 plus 1. Apparently, however, these pulses do not present any definite recurrence, and the *g*) train can be considered as aperiodic within each of its decades. Further, in its U and D decades, it presents a number of pulses higher than nine. In other words, the coded train *g*) has the representation of the gross result of addition, without the carries having been effected. It has to pass through a carry-over operator and the final output train will then have the correct presentation shown at *h*), which represents the net result of the addition.

Such an operation of addition, which can be extended to more than two coded trains, may be performed by means of a simple circuit shown, for instance, in Fig. 4, which consists of a mixer stage followed by a carry-over operator 30 which will further be described in detail with reference to Fig. 9.

The mixer may comprise, as shown in Fig. 4, two tubes 26 and 27 (at least one tube per incoming coded train); these tubes have separate inputs at their respective control grids but a common plate load 28. They are shown as triodes but in actual practice pentodes may be used; their plate-to-cathode impedance is of a relatively high value and a faithful restitution of the output amplitude levels can be procured by providing, if necessary, in the usual manner, a further plate limitation characteristic at the mixer stage. The common plate output is connected to the input of the carry-over operator 30 which, at 31, delivers the rectified coded train *h*). The coded input trains are applied respectively on the input terminals 24 and 25, and their relative shift is provided by means of a delay element 29 such as an artificial delay network arranged, for instance, between the input terminal 25 of the *e*) coded train, and the control grid of mixer tube 27. If the circuit is extended to more than two inputs, the values of the delaying sections will be varied from one input to the following. If necessary, the width of the incoming pulses will be reduced prior to their application on the inputs of the mixer stage, for instance in a manner which is to be described later in connection with Fig. 8.

Figure 5:
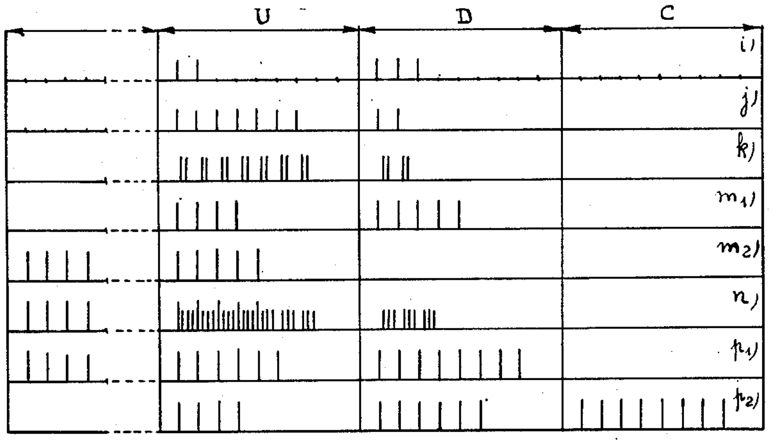
Fig. 5 shows a diagram of pulses illustrating an example of multiplication of two numerical quantities in accordance with the invention.

Fig. 5 illustrates two coded trains *i*) and *j*), representing for example, the numerical quantities 32 and 27 respectively. If these quantities are to be multiplied with the coded train *i*) forming the multiplicand and the coded train *j*) the multiplier, operation in accordance with the present invention proceeds as follows:

The digit of units of the multiplicand, represented by the two pulses in the decade or minor cycle U on the drawing, is statically registered on mixer stages, and the coded multiplier train *j*) is applied in parallel on the input of the mixer stages. The unit decade of the partial addition train thus obtained is indicated at *k*) in Fig. 5. It comprises 14 pulses, $2\times7$. The phase shifts between the pulses emerging from the mixer stages are obtained by the provision of different delays in the mixing channels, for instance in the output channel. The tens decade of the partial addition train *k*) comprises $2\times2=4$ shifted pulses. In both decades, the pulses are relatively aperiodic.

This first partial result train is first corrected as to its presentation by passing through a carry-over operator and the net result train is then delayed by a suitable time interval; during this time interval the units digit of the multiplicand is cancelled from the static register and is replaced by the tens digit of the multiplicand, which is 3 in the example concerned. The coded multiplier train *j*) is reapplied to the inputs of the mixer stages but, this time, the coded train $m_1$ which represents the net result of the first partial operation, is simultaneously applied to the mixer with a phase lead of a minor cycle, or a decade, with respect to the input of the carry-over operator. In Fig. 5 the time abscissa is supposed to progress by a major cycle between lines $m_1$ and $m_2$ as well as between lines $p_1$ and $p_2$. The four pulses of the first minor cycle of train $m_1$ indicated at $m_2$ will pass without any change through the carry-over operator. The five pulses, however, existing in the second minor cycle of the partial result train are mixed, during this step of operation, with the pulses resulting from the mixing of the outputs of the mixer stages. The second partial result train applied on the input of the carry-over operator is then of the configuration indicated at *n*), Fig. 5. There will be four pulses in the first minor cycle, twenty-six (5 plus 3×7) in the second minor cycle, six pulses (3×2) in the third minor cycle. At the output of the carry-over operator, the rectified train has the presentation shown at $P_1$). The final result train issuing from the multiplier and shifted to a normal place in a major cycle is of the representation shown at $P_2$). There will be four pulses in its first decade (units digit), six pulses in its second decade (tens digit) and eight pulses in the third decade (hundreds digit); its code is, as it should be, 864 i. e. the net result of the multiplication of 32 by 27.

The multiplication process is apparently extensible to any number of decades for one and the other of the coded trains. Fig. 5 shows a block diagram arrangement of such a multiplying circuit. The coded train *i*) multiplicand is applied, digit by digit, to a step-by-step counter 1–I–IX, through the input terminal 34. This counter is so arranged that its final condition presents as many stages at work as input pulses have been applied. For instance when registering the first decade digit of coded train *i*) step-by-step counter 35 has received two pulses from the U digit and has its two first trigger stages at work, the upper tubes being off (white); its other trigger stages will be at rest, the upper tubes being on (hatched).

The plate conditions of the higher tubes of the trigger stages I to IX control the on and off conditions of an equal number of gates 41 to 49; these gates have their control grids connected in common to an input channel 36 for coded input train *j*) from terminal 32. The gating arrangement is then similar to that shown in Fig. 2, if considered stage by stage. At 33 there is indicated a pulse shaper, the operation and circuit of which will be described later.

Fig. 7 shows by way of illustration, a circuit arrangement of the step-by-step counter of Fig. 6. Each trigger stage comprises a twin triode, the plate and grids of which are mutually coupled by means of time constant networks such as 57 and 58; the control grids are connected to the ground through resistors 60 of equal or uniform value and the cathodes of all the stages are also connected to ground through a self-bias network 61. The actuation input of each stage is derived from a plate resistor bridge 56. Further, a capacitive link 59 extends from the plate of the left triode element of each stage II to IX to the control grid of the right triode element of the next preceding stage.

The step-by-step operation of such a counter chain can, briefly, be stated as follows: The general rest condition is the one in which all the right elements of the twin triode tubes are on; a negative pulse incoming at 34 triggers the first stage, I, and the left triode of the stage is on; the gate 41 is placed in its on condition by the right triode which is now off in the first stage. The second incoming pulse applied at 34 brings stage I back to rest and a negative pulse is thus delivered by this stage to the second stage II, which is triggered to work, thus unblocking the mixer gate 42. The left hand element of stage II delivers a negative pulse which resets the first stage to work since it comes upon the right hand element of this first stage which is on and which then comes off, thus restoring mixer gate 41 to its unblocked condition. Two incoming pulses have been counted; the two first stages of the counter are at work and the two first gates are conductive. This process is continued for further incoming pulses.

The outputs of the gates 41 to 49 are distributed over input taps of a delay line 37 terminated at one end with its characteristic impedance 38, as usual. When a pulse form train *j*) reaches through common conductor 36, simultaneously all the input grids of stages 41 to 49, this pulse will pass only through those of the gates which are conductive. A number of pulses equal to the number of conductive gates (from the left to the right in Fig. 6), will reach the corresponding input taps of delay line 37, and these pulses are automatically stepped or distributed in time relation by the spacing between these input taps, which is preferably made equal to $\theta/10$. Furthermore an end-section of the delay line, at the right, is additionally provided with a $\theta/10$ time-shift and thus the zero (0) instances of the ten time intervals $\theta/10$ within each moment of code $\theta$ are left unused by the pulses issuing from the output terminal 39 of this delay line. The pulses resulting from the duplication, triplication, a. s. o. of each incoming pulse of the multiplier train and emerging from the mixer can only exist at the instances from (1) to (9) of each moment of code $\theta$ of this train emerging at terminal 39.

The coded train of partial result, thus obtained, is applied on the input of carry-over operator 30 and is transferred by this operator with a rectified presentation of its pulses throughout its decades. However, as it will be seen later, carry-over operator 30 introduces an overall delay equal to a minor cycle, $\tau=10\theta$, during the transfer of a coded train from input to output terminals.

The coded partial result train issuing from carry-over operator 30 is passed through a delay element 50 and a pulse shaping or regenerating circuit 52, and is reapplied at 55 on the input of the carry-over operator. The pulses existing in this train occupy the (0) places of the ten $\theta/10$ time intervals in a moment of code $\theta$ of each minor cycle. Assuming, for instance, that a major cycle of the computer concerned is $T=20\tau$, with the carry-over operator 30 itself introducing a delay equal to $\tau$, the electrical length of delay element 50 will be equal to $T-2\tau$. Thus, the first minor cycle (unit decade) of the train of partial result which is fed back to the carry-over operator presents a phase lead of a complete minor cycle with respect to first minor cycle of the second gross result train of the multiplication, each partial operation of which is initiated a time interval T after the preceding one.

In such an operator circuit, it is apparent that only a time interval equal to $\theta/10$ is allotted to each pulse. On the other hand, a time interval allotted to a pulse is $\theta$ in the transmission circuits of the complete computer. Shaping circuits are then to be inserted at such places as indicated at 33 and 52, for reducing the width of the applied pulses. Such a shaping circuit is illustrated in Fig. 8, and may comprise a three-grid tube 33, the control grid of which receives the pulses to be reshaped. The control grid bias is indicated at 62. The screen grid is biased at the plus B voltage. The suppressor grid receives a series of recurrent pulses, regularly spaced by $\theta$, of positive polarity and very narrow width (shorter than $\theta/10$). With such a circuit arrangement, any broad pulse 67 which is applied in positive polarity on terminal 32, and thereby on control grid of tube 33, renders this tube conductive only during the period in which the short pulse 68 is applied on the suppressor grid by input terminal 51. At the output 53 of the stage, a narrow reshaped pulse, such as 69, will appear. The value of grid bias 62 provides a clipping at the level indicated at 65, and the value of the plate resistor 64 provides a plate amplitude limitation at the level indicated at 66.

By way of illustration, computer of normal speed may have $\theta=20$ microseconds, and thus $\theta/10=2$ microseconds, $\tau=200$ microseconds, and $T=4$ milliseconds.

Fig. 9 shows in greater detail carry-over operator 30 such as provided in accordance with the invention. It consists mainly of an arrangement of three decade binary counters, each capable of counting ten incoming pulses and of delivering an output pulse each time it returns to its general zero condition.

From input 39 (or 55) the first binary trigger stage 71 is actuated. The first decade counter comprises the four binary stages 71—72—73—74. When nine incoming pulses have been counted, the tenth pulse actuates the last trigger stage 74 which delivers a carry pulse to the input trigger stage 91 of the tens decade counter which comprises the four binary stages 91—92—93—94. These two decade counters together insure the count of 99 incoming pulses. For use in a carry-over circuit according to the invention, the number of incoming pulses will not exceed 81, not taking into account the carry pulses. This is, because the static register 35, Fig. 6, of the multiplier circuit, can only store nine pulses, and the highest number of pulses in a minor cycle of the multiplier train is also nine. To these eighty-one pulses, at the utmost, nine carry pulses can be added from the preceding partial product.

The third decade counter 101—102—103—104 is adapted to the reconversion into a number of coded pulse train, the decimal digit of the rectified number which is obtained at each minor cycle in the first decade counter 71—74 and is transferred to the third decade counter, before each resetting (for a new count) of the first decade counter.

Each of trigger stages 71—74—, 91—94, 101—104, is of the bistable kind of any well-known circuit arrangement. The cascade connection of the four stages of each decade counter is achieved by derivative connections (a connection including a series condenser, which are indicated at 75 to 77 between trigger stages 71—74, at 105 to 107 between the trigger stages 91—94, and at 148 to 150 between trigger stages 101—104. Each coupling connection extends from the plate output of the stage tube which is on in the rest condition of a stage, to a symmetrical input to both control grids or plates of the paired tubes in the next following trigger stage.

The output 78 of the last trigger stage 74 of the units decade counter 71—74 is connected through a delay element 82 to the input actuating connection 83 of the first trigger stage 91 of the tens decade counter 91—94.

Units decade 71—74 is reset by pulses applied on terminal 79 and which, delayed by delay element 80, are brought by conductor 81 to all the asymmetrical actuation inputs 86 to 89 of trigger stages 71 to 74. Each resetting pulse acts to place in off condition any tube which is on at its instant of application, and, of course, has no effect on any tube which was previously off.

The tens counter is similarly provided with a reset arrangement extending from terminal 90 through delay element 95, and conductor 96 to the asymmetrical reset inputs 98 and 99 of trigger stages 92 and 93, and through conductor 97 to the asymmetrical reset inputs of trigger stages 91 and 94 of that tens decade counter.

Each asymmetrical resetting input of a trigger stage is directed to the tube which is off in the rest condition of the stage concerned.

From outputs 105 to 108 of trigger stages 91 to 94, of the tens decade counter, there are derived direct current connections, 110 to 113, to the suppressor grids of the respective gate tubes 114 to 117. The control grids of these stages through respective inputs 119 to 122, receive from a common actuation terminal 118, the transfer control pulses from the tens decade counter to the units decade counter; a transfer control pulse is applied at 118 at the beginning of each minor cycle. The individual outputs of gate tubes 114 to 117 are connected respectively, through delay elements 123 to 126, to asymmetrical actuation inputs 127 to 130 of trigger stages 71 to 74 of the units decade counter.

Furthermore, each time the units decade counter delivers an output pulse on connection 83, both intermediary trigger stages 72 and 73 of this units decade counter are reset to work; the output pulse towards the tens decade counter is derived on the asymmetrical inputs 128 and 129 of these stages through direct connections such as 84 and 85.

At each minor cycle, also, the digital value counted in the units decade 71—74 is transferred into the third decade counter 101—104 for monitoring and controlling the formation of the coded train output from the carry-over operator. This transfer is effected through gate tubes 135 to 138, the conditions of which are controlled respectively from the conditions of the trigger stages 71 to 74 of the units decade counter by means of direct current connections 131 to 134 extending from the plate outputs of the tubes in these trigger stages which are disposed in the lower part of the drawing. The control grids of gate tubes 135 to 138 are, through respective inputs 140 to 143, connected in common to a terminal 139 which receives the minor cycle program pulses. The output connections from gate tubes 135 and 136 to trigger stages 101 and 102 are delayed as indicated at 144 and 145, while the plate output connections 147 and 148 between gate tubes 137 and 138 and trigger stages 103 and 104 are plain direct current connections. Trigger stages 101, 102, and 103 of the third decade counter are cascade connected over circuits 148′, 149 and 150.

The output 151 of this third decade counter is, firstly, re-applied through a delay element 152 and a common conductor 153 to the asymmetrical actuation inputs 154 to 156 of the three trigger stages 101 to 103 opposite to those asymmetrical actuation inputs which in these stages receive the transfer pulses from gate tubes 135 to 137. Output 151 is also applied, through conductor 164, to an asymmetrical actuation input of a bistable trigger stage 163. The other actuation input of trigger stage 163 is connected through a delay element 162 to terminal 161. The plate output from the upper tube of trigger stage 163 is connected to the suppressor grid of a gate tube 159 which, on its control grid, receives through terminal 160, a series of recurrent pulses. The plate output of gate 159 is connected to the output channel (or the feed back channel) 31/40 of the carry-over operator. At point 158, a derivation extends to the symmetrical actuation of input 157 of the first trigger stage 101 of the third decade counter of the arrangement.

Now, the delay elements 80, 82, 95, 152 and 162 are so arranged as to present a transfer constant of the order of a fraction of $\theta$, for instance between $\theta/10$ and $\theta/4$. Delay element 145 may be provided with the same time constant but delay elements 123, 124, 125, 126 and 144 are provided to impart a delay of double value, for instance between $2\theta/10$ and $\theta/2$ to the transferred pulses. Upon terminals 79, 90, 118, 139 and 161, there are applied the program control pulses *c*), Fig. 1, i. e., a single pulse at the zero instant of the first moment of code of each minor cycle. Upon terminal 160, there is applied a train of recurrent pulses spaced by $\theta/10$, similar to the series *d*) of Fig. 1 but with its pulses arranged exactly upon points 0, 1, 2 . . . 9 of each minor cycle.

Each binary stage of Fig. 9 may be considered as being constituted in accordance with any binary stage of Fig. 7, coupling connections 59 being obviously omitted. The asymmetrical actuation inputs referred to in the description of the carry-over arrangement of Fig. 9 are then obvious; they consist of separate inputs to the control grids of a trigger stage.

A circuit arrangement for any gate in Fig. 9 can be easily conceived from the one shown in Fig. 2 for a gate controlled by a bistable trigger stage.

The operation of a carry-over device according to the invention may be explained as follows:

In the initial state of the operator, the decade counters are in the following conditions: The units decade 71 to 74 marks the digital value 6, with the upper tubes on in trigger stages 71 and 74, and off in trigger stages 72 and 73; the tens decade 91 to 94 marks the digital value 6, with the upper tubes on in trigger stages 91 and 94 and off in trigger stages 92 and 93; the third decade 101 to 104 marks the digital value 7, with the upper tubes off in trigger stages 101, 102, 103, and on in trigger stage 104. These conditions represent the general rest or zero conditions of the carry-over operator.

The pulses to be counted are applied on the input 39 (or 55) at each minor cycle but with a phase lag of $\theta$ with respect to the start of each minor cycle. In other words, no pulse will enter between the instants 0 and 1 of that minor cycle. On the contrary the pulses to be counted are applied during the nine following moments of code of each minor cycle and the number of these incoming pulses can vary from 0 to 81 in the first minor cycle of operation of the carry-over operator, when connected to the output of a multiplier arrangement as described. This number of relatively aperiodic pulses has to be coded into a correct number of pulses by minor cycle, as explained. If, for instance, thirty-five incoming pulses are present during the first minor cycle, the units decade will mark the digital value 11 (digital value 6 taken as zero, plus digital value 5, units digit of the counted pulses). The tens decade will mark the digital value 9 (digital value 6 taken as zero, plus digital value 3 of the counted pulses).

In a decade counter of the kind disclosed, the progress of a count is well known per se and may be summarized as follows: The first incoming pulse triggers to work stage 71 and the second pulse resets that stage to rest, which delivers an actuation pulse to the second stage 72 (which was at work) which is thus reset to rest and delivers also a resetting pulse to the third stage 73 which comes to rest, and thus actuates the fourth stage 74 which comes to work. The third incoming pulse brings the first stage to work and the fourth resets it back to rest, which causes the second stage to come to work. The fifth incoming pulse brings to work the first stage and the sixth resets it to rest, thus delivering to the second stage 72 a pulse which resets it to rest and the third stage 73 comes to work. The seventh incoming pulse rocks to work the first stage and the eighth pulse resets it to rest, hence the second stage 72 is brought to work. The ninth incoming pulse brings the first stage to work and the tenth sets it back again to rest. The second stage returns to rest, the third stage also returns to rest, and controls the resetting to rest of the fourth stage, in a cascade progression. Last stage 74 delivers on its output 78 a decimal carry pulse towards the input of the first stage 91 of the tens decade counter; stage 91 is brought to work. Simultaneously, through feed back connections 84 and 85, the two intermediary stages 72 and 73 of the units decade counter are reset to work so that the count in this decade starts again from the digital value 6 for the next incoming pulse (the eleventh one). In the tens decade counter the progression of a count is similar but is only due at each tenth pulse incoming at 39.

At the end of the first minor cycle, which is the units cycle of the operation in progress, the count of the thirty-five incoming pulses by both decade counters 71—74 and 91—94 has placed these decades in the following conditions:

In the units decade, the three trigger stages 71, 72 and 74 are at work and trigger stage 73 is at rest; in the tens decade the two trigger stages 91 and 94 are at work and the two trigger stages 92 and 93 are at rest. From these conditions, it results that, of gates 135 to 138, only gate 133 is conductive, and of gates 114 to 117, both gates 114 and 117 are conductive. These conditions are apparent from the control connections shown for those gates from the associated trigger stages.

The next following minor cycle begins at a moment of code during which no incoming pulse is applied at 39.

At the zero instant of the (0) moment of code of this minor cycle, a transfer control pulse is applied to all terminals 79, 90, 118, 139 and 161.

From input terminal 139, this control pulse passes through the conductive gate 133 and reaches the corresponding asymmetrical actuation input of trigger stage 103 of the third decade counter. Trigger stage 103 comes to rest, thereby actuating to work the following trigger stage 104. The third decade counter is then in its condition of the digital count 11, with its stages 101, 102 and 104 at work and its stage 103 at rest. Its general rest condition was 7 and it has received 4 from the transfer from the units decade 71—74, which was in its condition of the digital count 11=15−4. The transferred digit 4 thus represents the complementary to 15 of the count of the units decade, and the third counter presents the digital value marking 4 in addition to its digital rest value 7, and it can be said that this third counter is in a state which denotes the complement to 9 of the true number, 5, of the unit counted in the preceding minor cycle on the units decade 71—74.

It will be noted that, in such a transfer from the units decade counter to the third decade counter, when several pulses pass through transfer gates 135 to 138, the pulses from the gates controlled by the three first stages 72, 71 and 73 will present a progressive shift in time, due to the provision of delay elements 144 and 145. This serves to insure the possibility of internal transfers between the trigger stages of the third decade. Such a relative shift is useless between the two last stages of the decade as no simultaneous transfers can occur through gates 133 and 134. Both stages 73 and 74 should then be in their rest conditions, and the units decade counter should present a count lower than or at most equal to 3; its rest condition is 6 which is higher than 3.

The transfer control pulse applied on terminal 118 has passed through the first and fourth gates 114 and 117, and the transfer pulses have reached the corresponding asymmetrical inputs 127 and 130 of trigger stages 71 and 74 of the units decade counter with delays defined by the delay elements 123 and 126 as being twice the value of delay element 80 inserted in conductor 81 from the general rest-to-zero of the units decade by the pulse applied at 79. The delay imparted to 80 for such a reset-to-zero was in itself sufficient to realize the above-described transfer to the third decade counter.

The actuating transfer pulses from the delayed channels 123 and 126 will then reach their respective trigger stages 71 and 74 of the units decade at time instants when the trigger stages are at rest, and these stages will be reset to work. The units decade counter thus presents the condition which was the one reached by the tens decade at the end of the previous minor cycle, and the carry has been properly effected.

The tens decade counter is reset to its rest condition (digital value 6) by the pulse which is applied at 90 and is delayed at 95, and which through derivations 96 and 97, acts upon the four trigger stages 91 to 94. At the same time the reset pulse from terminal 79 resets the units decade.

From the input terminal, then, a new set of incoming pulses, corresponding to the second minor cycle or tens decade of the operation in progress, is received by the counter constituted by the units decade 71—74 and the tens decade 91—94, whereby decimal carry has been realized from the tens decade to the units decade.

During this new count, the third decade will deliver the units digit of the true (or net) result of operation in the following manner:

A control pulse is applied at 61 and delayed at 162, the trigger stage 153 actuated, and gate 159 controlled by this trigger stage, is conductive. Gate 159 then transmits the clock pulses which are applied to its control grid by terminal 160. These pulses are fed to the output channel (31) (40) and are also applied on the actuation input of the third decade counter at 157. This third decade stops on from its initial condition each time an incoming pulse is present. In this initial condition, trigger stages 101, 102, 104 are at work and trigger stage 103 is at rest. The first output pulse will then bring to rest trigger stages 101 and 102, and to work trigger stage 103. The second pulse resets to work the first stage 101 and the third brings it back to rest again, thus actuating to work trigger stage 102; the fourth pulse resets to work the first stage 101 and the fifth brings it back to rest. The remaining stages are then actuated in a cascade progression so that the last stage 104 delivers an output pulse. This output pulse, delayed by a short interval of time at 152, is applied to the asymmetrical actuation inputs 154 to 156 of the three first stages 101 to 103 which are reset to work. This pulse is also applied to the corresponding input of trigger stage 163 which is reset to rest and thus blocks gate 159 which stops the transmission of pulses to output channel 31/40 and to the actuation input of decade counter 101—104. Five regularly spaced pulses have been sent in the output channel, at the moments of code from 1 to 5 of the second minor cycle, and the place of each of these pulses in its moment of code is the (0) instant suitable for further operation as has been detailed above.

When used in an adder operator, such a carry-over device will only operate each time during a major cycle since the coded trains representing the numerical quantities to be added, can have code moments covering, at the utmost, a single major cycle T.

When used in a multiplication operator, such a carry-over will operate in consecutive major cycles to form a partial product covering, at the utmost, such a major cycle; the net partial product trains issuing from the carry-over operator, must be directed back to its input with a predetermined phase shift.

A program of operation for such a multiplication process will now be described with reference to Fig. 10 which illustrates an arrangement in which the computer is supposed to include magnetic storage equipments. Such equipments are well known per se and need not be described in detail.

For a suitable understanding of the arrangement of Fig. 10 it will suffice to state that in a storage equipment of such type, the storage delay lines are constituted by circular lines impressed around a permanently rotated magnetic drum, for instance a drum with a nickel surface. Recording, reading and (or) cancelling heads can be arranged at will around these circular lines or tracks.

In the arrangement shown in Fig. 10, three magnetic tracks of this type are disclosed at 165, 171 and 174. On track 165, there is indicated the reading head 166. Track 165 bears a record of distribution in time such as indicated at *a*), Fig. 10. Reading head 166, at each major cycle T, picks up in succession the digits of the code of the numerical quantity B with digits arranged in time in ascending powers, a auxiliary control signal S, a casual blank interval V, and the digits of the code of the numerical quantity A also arranged in the sense of ascending powers. Codes A and B are recorded in pulse position codes and, prior to their use in a multiplication process, will have to be converted into number pulse codes. Numerical code B is assumed to be the multiplicand and numerical code A the multiplier. The maximum number of decimal figures for A plus B is assumed to be nineteen, and the blank interval V is zero. The signal S is such that it occupies a minor cycle, i. e. the minor cycle which follows the last significant minor cycle of the code B. It only comprises the two first pulses at the places (0) of code moments (0) and (1) of such minor cycles, as indicated at *a*), Fig. 10. When the time interval V exists, as also indicated on diagram *e*), it occupies an integral number of minor cycles.

Reading or pickup head 166 for storage track 165 applies the corresponding electric signals on input 11 of a converter 10/21 which translates a pulse position code into a number pulse code. Such converter component circuit has been shown in Fig. 2. It delivers for its output 23 the coded pulse a number signal in parallel to the inputs or control grids of transfer stages 167 and 168, which function as gates controlling respectively, the orientation of the A code and the B code.

The pulses of coded signal A pass through gate 167 and are reshaped at 33 (the detail of which has been given in Fig. 8) before being applied on gates 41—49 of the multiplier operator proper (the circuit of which has been given in Fig. 6). The pulses of coded signal B pass through gate 168 and are applied through output conductor 34 to step-by-step storage counter 35.

The carry-over operator, detailed in Fig. 9, is indicated as a unit 30, and in its output is inserted a gate 169 for picking out of the final coded train of the net product. The feedback channel for the partial product trains to the input of the carry-over operator contains gate 170 controlling a recording head for a magnetic track 171. Track 171 plays the part of the previously mentioned delay element 50, i. e. the signals recorded by recording head 171 are read time $T-2\tau$ later. This reading is changed by pick-up head 173 which also comprises a cancellation-after-reading arrangement. After reshaping at 52 these signals are reapplied at 55 with an over-all relay $T-\tau$, as explained above.

The program signals required for the operation of such a computer are delivered from magnetic track 174. Track 171 has recorded thereon a series of short clock pulses. These pulses are read by head 175 and picked up at output 176 to be applied, for instance, on terminals 22, 51 and 53 of Fig. 10.

These clock pulses are also applied to the input of a frequency divider or distributor circuit 177 which, for example, consists merely of a decade counter delivering an output pulse each time ten input pulses have been counted. In another embodiment it may consist of a pulse distributor the tenth tap of which will be used as an output terminal for the application at 178 of minor cycle program pulses. From the first stage of this counter of from the first tap of distributor 177, the first program pulse of each minor cycle will be applied to terminal 179 for controlling the circuit 180 provided for the selection of the S signal from storage track 165.

The repetition frequency of this series of short pulses is divided by twenty in circuit 181 which may also consist of a counter delivering an output pulse at 182 each time twenty pulses have been applied on its input. On lead 182, there thus appears a series of major cycle pulses T, such as indicated at *d*), Fig. 10.

The series of minor cycle program marking pulses is also applied to gate 183 controlled by trigger stage 189; when this gate is conductive, the $\tau$ pulses reach another repetition frequency divider 184 which delivers an output pulse each time twenty-one input pulses have been counted. These output pulses are indicated at T′ in the diagram *d*) of Fig. 10. Their individual length is $\tau$ and they are spaced by a time interval of $T+\tau$. Such a frequency divider may consist of a step-by-step ring counter. One of the plate leads of such ring counter will deliver such a series of pulses. It may also comprise a binary chain of usual counters and, in such case, it will also incorporate, as indicated on diagram *b*) of Fig. 10, a bistable trigger stage 185 which receives on one of its separate actuation inputs the output pulses from divider counter 184. The other actuation input will receive the pulses available at 178 and applied at 186. The output lead from this frequency divider, indicated at 187, controls the condition of gate 168 which thus becomes conductive each time a pulse of the length of a minor cycle is delivered from the frequency divider.

Transfer gate 183 is further placed under the control of a trigger stage 188 which normally maintains this gate non-conductive, by means of a suitable voltage on lead 189, and as long as a multiplication process is not initiated. The condition of bistable trigger stage 188 is reversed and a multiplication process is initiated when stage 188 receives on its tube which is conductive at rest, an initiating pulse. This pulse is derived over lead 190 from the general program control equipment of the computer of which the multiplier arrangement forms part.

Frequency divider 184 will operate only during the time interval of multiplication process. When this operation is terminated, trigger stage 188 will receive a reset pulse on its other actuation input 192, and the frequency divider 184 will also be reset to its zero count condition by the resetting pulse passing through reset connection 193. A third lead 194 is provided, if necessary, for indicating to the general program control circuit the completion of the multiplication order which it had previously sent.

Upon reception of the initiating pulse on lead 190, the operation of the arrangement disclosed in Fig. 10 is automatically controlled. Such control is achieved, on the one hand, by frequency divider 184 and, on the other hand, by a selection circuit for the abovementioned S signal. This S signal is used at both ends of the process, namely, for controlling the registering on step-by-step counter 35 of successive decimal digits of multiplicand B, at consecutive major cycles, and for clearing the multiplier operator by opening the final output gate 169 once the digits of the signal are exhausted, and further by generating the reset signal on leads 192—193—194.

Pick-up head 166 for magnetic storage track 165 also delivers the stored pulses to code converted 10/21 and to a conductor 195 which leads them to one input of a time coincidence detector 196. The other input of coincidence detector 196 is connected to the output of a derivation comprising a gate stage 180 followed by a delay element 197 of an electrical length equal to $\theta$. The circuit of coincidence detector 196 may be such as indicated at *c*) in Fig. 10, i. e. it may comprise a three-grid tube which receives on its first and third grids, in positive polarity, the pulses from 195 to 197, respectively, so that this tube is conductive only when two pulses coexist on both of these inputs.

As previously mentioned, gate tube 180 is only rendered conductive when, at the (0) instants of each minor cycle, a minor cycle pulse from 178 is applied to its input 179. Gate 180 can only pass the first pulse of the S signal, as there is no such first instant pulse present in the B and A signals. A coincidence of pulses at both inputs of coincidence detector 196 can only be found for the S signal. Thus the output of stage 196 will represent this signal.

The output of coincidence detector 196 is directed to one input 198 of a trigger stage 199 which receives through lead 182 on its other actuation input the signal T marking the major cycles. Trigger stage 199 in its rest condition (as indicated on the drawing) renders gate 167 nonconducting for the transfer of the A signal. In its work condition, however, and immediately after having received a pulse from coincidence detector 196, trigger stage 199 renders gate 167 conducting so that the coded multiplier train A can pass during the time comprised between the instant of occurrence of the S signal and the instant of application of the T pulse marking the beginning of the next major cycle. The direct control connection from trigger stage 199 to the suppressor grid of gate 167 is indicated at 200.

Transfer gate 168, on the other hand, is so controlled as to pass only a minor cycle, of a rank progressively increasing in consecutive major cycles, of number coded pulse train B. This control is insured by the direct connection 187 from the frequency divider 184 to its suppressor grid. Through a derivation 202 of output control lead 187 a transfer gate is coupled to gate 168 but the control grid of gate 201 is connected to the output of coincidence detector 196, as indicated by lead 203. The minor cycle in which the S signal occurs follows immediately the last minor cycle of the B signal. Thus by means of the progressive shift of opening of gate 168 and 201, the coincidence signal from 196 will pass through gate 201 at the time when the S signal passes through gate 168, but records the digit zero in the register 35, since the S code, as translated in pulse number code in the converter 10/21, is zero. The series *d*) of pulses in Fig. 1 is, in the arrangement of Fig. 10, so phased as to present its discrete pulses exactly at the places (0), (1). The two pulses of the S signal are also phased to these places (0) and (1). The first pulse from the S signal is coincident with the pulse which opens the gate 21 and is not transmitted. The second pulse from the S signal is coincident with the second pulse of the *d*) series, and is not transmitted either since gate 21 is closed at the same instant.

The pulse from coincidence detector 196 transmitted through gate 201, actuates through input 204 a trigger stage 205. This trigger stage will be reset by the subsequent major cycle pulse T from lead 182. By returning to its rest condition at this instant, trigger stage 205 in turn operates with a small delay, provided by series delay element 207 inserted in output connection 208. Trigger stage 205 actuates a second trigger stage 209 which, through its other input 210, is also set to rest by major cycle pulses T. When trigger stage 209 comes to work, the voltage on lead 211 opens the final output gate 169, so that the coded train representing the net result of multiplication, can pass to the further circuits of the computer. It also renders non-conducting the transfer gate 170 which has during the operation process transmitted the coded partial result train issuing from the carry-over operator 30, back to the delay storage track 171. The control lead from trigger stage 209 to transfer stage 170 is indicated at 212, extending from a plate output of the trigger stage to the suppressor grid of gate 170. The delay $\epsilon$ at 207 provides a time length of T—$\epsilon$ for these two last controls, since trigger stage 209 is reset to zero by the next major cycle pulse T, following the major cycle pulse which has reset to rest trigger stage 205.

The derivation (differentiation) at 213 of the fore front of the rectangular voltage issuing from trigger stage 209 on lead 211 produces the reset pulse of trigger stage 188 and frequency divider 184, and this pulse also acts as a signal of completion of multiplication in the general program control circuit 191.

The invention is not limited to the circuits and circuit elements actually shown and described but may be applied in practice in any form or manner whatsoever without departing from the scope of this disclosure.

What I claim is:

1. In or for a digital electronic computer for handling denary radix number coded pulse trains representative of numerical quantities in decade time intervals arranged in ascending powers of the denary radix, means for mixing at least two input trains with a relative shift of a value lower than the time interval of a pulse period, means including at least a units decade counter and a tens decade counter in cascade connection for counting in each decade time interval the number of said relatively shifted pulses, an auxiliary decade counter, means for transferring at the end of each decade time interval the count of said units counter to said auxiliary counter, means for simultaneously transferring the count of the tens counter to said units counter, and means for simultaneously deriving from said auxiliary counter a series of pulses spaced by a time interval equal to a pulse period in a decade time interval of the computer and representative of the decimal count in said auxiliary counter.

2. In or for a digital electronic computer for handling denary radix coded pulse trains representative of numerical quantities in decade time intervals arranged in ascending powers of the denary radix, means for converting each incoming time position coded pulse train into a number decade coded pulse train, means for mixing at least two number coded input pulse trains with a relative shift of a value lower than the time interval of a pulse period, means including at least a units decade counter and a tens decade counter in cascade connection for counting in each decade time interval the number of said relatively shifted pulses; an auxiliary decade counter, means for transferring at the end of each decade time interval the count of said units counter to said auxiliary counter, means for simultaneously transferring the count of said tens counter to said units counter, and means for simultaneously deriving from said auxiliary counter a series of pulses spaced by a time interval equal to a pulse period in a decade time interval of the computer and representative of the decimal count in said auxiliary counter.

3. In or for a digital electronic computer for handling denary radix coded pulse trains representative of numerical quantities in decade time intervals arranged in ascending powers of the denary radix, an encoder comprising at least a counter including units and tens decade counters in cascade connection, means for applying on the actuation input of said units counter a series of aperiodic pulses relatively shifted by a value lower than the time interval of a pulse period in the computer, means for counting in each decade time interval of the computer the number of said relatively shifted pulses, an auxiliary decade counter, means for transferring at the end of each decade time interval the count of said units counter to said auxiliary counter, means for simultaneously transferring the count of said tens counter to said units counter, and means for simultaneously deriving from said auxiliary counter a series of pulses spaced by a time interval equal to a pulse period of the computer and representative of the decimal count in said auxiliary counter.

4. In or for a digital electronic computer for handling denary radix pulse coded trains representative of numerical quantities in decade time intervals arranged in ascending powers of the denary radix, means including at least a units decade counter and a tens decade counter in cascade connection, for counting in each decade time interval of the computer the number of pulses resulting from the mixing in relative phase shifted occurrence of at least two incoming number coded pulse trains, an auxiliary decade counter, means for transferring at the end of each decade time interval the number counted in said units counter to said auxiliary counter, means for simultaneously transferring the count of said tens counter to said units counter, and means for simultaneously deriving from said auxiliary counter a series of pulses spaced by a time interval of a pulse period of the computer and representative of the decimal count in said auxiliary counter.

5. In or for a digital electronic computer for handling denary radix coded pulse trains representative of numerical quantities in decade time intervals arranged in ascending powers of the denary radix, means including a units decade counter and a tens decade counter in cascade connection, for counting in each decade time interval of the computer the number of pulses resulting from the partial products of a multiplier number coded pulse train by the consecutive digital values of a multiplicand number coded pulse train, each partial product being initiated at each major cycle of the computer, an auxiliary decade counter, means for transferring at the end of each decade time interval the number counted in said units counter to said auxiliary counter, means for simultaneously transferring the count of said tens counter to said units counter, means for simultaneously deriving from said auxiliary counter a series of pulses spaced by a time interval of a pulse period of the computer and representative of the decimal count in said auxiliary counter, and means for delaying said series of pulses and for reapplying them at the input of said counting means with a relative phase lead of a minor cycle interval of the computer with respect to the initiating instant of the next following major cycle of the computer.

6. In or for a digital electronic computer for handling denary radix number coded pulse trains representative of numerical quantities in decade time intervals arranged in ascending powers of the denary radix, a mixer circuit, a plurality of input leads to said mixer circuit, number coded input pulse trains being applied in phase relation to at least some of said input leads, delay elements in said input leads of progressively shifted values of delay not exceeding the time interval of a pulse period of the computer, a decade counter including at least a units counter and a tens counter in cascade connection, a transfer connection between the output of said mixer circuit and an actuation input of said decade counter, an auxiliary decade counter, means for transferring at the end of each decade time interval the count of said units counter to said auxiliary counter, means for simultaneously transferring the count of said tens counter to said units counter, and means for simultaneously deriving from said auxiliary counter a series of pulses equally spaced by a time interval of a pulse period of the computer and representative of the decimal count in said auxiliary counter.

7. In or for a digital electronic computer for handling denary radix number coded pulse trains representative of numerical quantities in decade time intervals arranged in ascending powers of the denary radix, a mixer circuit having a plurality of input and output leads, and a plurality of transfer stages connecting said input leads to said output leads, number coded pulse trains being applied in phase relation to at least some of said input leads, delay elements in said output leads of progressively shifted values of delay not exceeding the time interval of a pulse period of the computer, a decade counter including at least a units counter and a tens counter in cascade connection, a common transfer connection between the delayed outputs and an actuation input of said decade counter, an auxiliary decade counter, means for transferring at the end of each decade time interval the count of said units counter to said auxiliary counter, means for simultaneously transferring the count of said tens counter to said units counter, and means for simultaneously deriving from said auxiliary counter a series of pulses spaced by a time interval equal to a pulse period in a decade time interval of the computer and representative of the decimal count in said auxiliary counter.

8. In or for a digital electronic computer for handling denary radix number coded pulse trains representative of numerical quantities in decade time intervals arranged in ascending powers of the denary radix, in combination, a counter including trigger stages forming at least a units decade counted and a tens decade counter in cascade connection, an actuation input for said counter, means for applying to said actuation input a sequence of incoming aperiodic pulses in at least part of each of said decade time intervals except in their first pulse period, means for resetting said units counter each time it delivers an actuation pulse to said tens counter, delay means, means under control of said delay means for periodically clearing said units and tens counters by pulses marking the instant of beginning of the first pulse period of each decade time interval of the computer, a plurality of transfer gates respectively controlled by the trigger stages of said tens counter, having a common input circuit and a number of output circuits with delay means in at least some of them; the delayed outputs being connected to actuation inputs of the corresponding trigger stages in said units counter, and said common input circuit being connected for undelayed application of pulses marking the first pulse period of each decade time interval; an auxiliary decade counter including trigger stages and means for its resetting each time it delivers an output pulse, a plurality of transfer gates controlled respectively from the trigger stages of said units decade counter, and having a common input circuit and a number of output circuits with delay means in at least some of them; the latter delayed outputs being connected to actuation inputs of the corresponding trigger stages in said auxiliary counter, and said last common input circuit being connected for undelayed application of pulses marking the instant of beginning of the first pulse periods of said decade time intervals, an actuation input channel for said auxiliary counter, another trigger stage, a transfer gate in said channel controlled by said other trigger stage, an actuation connection for said other trigger stage from the output of said auxiliary counter, and another actuation connection for said other trigger stage including delay means for delayed application of pulses marking the first pulse period of each decade time interval of the computer, an input terminal for said last mentioned transfer gate for application of the timing pulses marking the pulse period in each decade time interval, and means for deriving from the output of said other transfer stage the transmitted pulses in each decade time interval of the computer.

9. In or for a digital electronic computer for handling denary radix number coded pulse trains representative of numerical quantities in decade time intervals arranged in ascending powers of the denary radix, in combination, a counter comprising at least a four binary trigger stage units decade counter including a back-acting connection from its output to its two intermediary stages resetting said two stages at work each time an output pulse is delivered, and a four binary trigger stage tens decade counter including a resetting connection for application of reset pulses at each first pulse period of each decade time interval, said resetting connection putting to work its two intermediary stages and to rest its two extreme stages, and including a delaying element causing a delay of less than a pulse period of the computer, a plurality of transfer gates respectively controlled by the trigger stages from said tens counter so as to mark the count of said counter by their conductive conditions, and having their outputs delayed by a time interval lower than the preceding one and respectively connected to a symmetrical actuation inputs of the four corresponding stages of said units counter, and means for clearing said units counter including an input circuit for receiving the pulses marking the first pulse periods of said decade time intervals, said input circuit including means for delaying said pulses by a time interval lower than the delay introduced in the outputs of said transfer gates, an auxiliary four binary trigger stage decade counter including a resetting connection from its output to work actuation inputs of its three first trigger stages, a plurality of transfer gates controlled by the trigger stages from said units counter so as to mark a count complementary to the count in said units counter, and having output circuits, the two first of which include delaying means connected to respective actuation inputs of the corresponding trigger stages of said auxiliary counter in its reset condition, an actuation input channel for said auxiliary counter, a transfer gate in said input channel receiving on its input pulses marking the pulse periods of the computer, said transfer gate having a trigger stage connected therewith and being controlled to be conducting in the work position of said trigger stage, the latter being actuated to work by pulses marking the beginning of each decade time interval of the computer and reset to rest by each output pulse derived from said auxiliary counter with a delay lower than a pulse period; an output connection being branched off at least one of the outputs of said transfer gate and auxiliary counter.

10. In or for a digital electronic computer for handling denary radix coded pulse trains representative of numerical quantities in decade time intervals arranged in ascending powers of the denary radix, in combination, a mixer having a plurality of input channels and a final output circuit and including means for mixing with relative phase shifts the pulses applied on at least some of said input channels in equal phase relation, a pulse narrowing shaper circuit in each of said input channels, and a two decade counter; an auxiliary decade counter, the two decade counter having its actuation input connected to said final output circuit and including means for transferring the count of its units decade to said auxiliary counter and the count of its tens decade to said units decade at each decade time interval, and means for resetting said auxiliary counter at each decade time interval by means of pulses marking the pulse periods of said decade time interval, said resetting means being automatically stopped when said auxiliary counter issues an output pules.

11. An adder device of denary radix number coded pulse trains representative of numerical quantities in decade time intervals arranged in ascending powers of the denary radix, comprising a plurality of input channels for a plurality of number coded pulse trains, a two decade counter including units and tens decade counters, a plurality of tubes having grids under control said input channels and having a common plate output connection to an actuation input of said two decade counter, and delay elements in said input channels for progressively shifting by a fraction of a pulse period the pulses of the applied coded trains, an auxiliary decade counter, means in said two decade counter for transferring at each decade time interval of the computer the count of said units counter to said auxiliary counter and the count of said tens counter to said units counter; and means for resetting said auxiliary counter at each decade time interval.

12. An adder device of denary radix number coded pulse trains representative of numerical quantities in decade time intervals arranged in ascending powers of the denary radix, comprising a plurality of input channels for a plurality of pulse number coded trains, a two decade counter including units and tens decade counters, a delay line having a plurality of input taps of a total electric length not higher than the time interval of a pulse period of the computer, a plurality of tubes having input electrode connected to at least some of said channels and gating electrodes connected to said input taps and an output terminal connected to an actuation input of said two decade counter, an auxiliary decade counter, means for transferring at each decade time interval the count of said units counter to said auxiliary counter and the count of said tens counter to said units counter, and means for also resetting said auxiliary counter at each decade time interval by applying on its actuation input pulses marking the pulse periods of the computer.

13. A multiplier device of denary radix number coded pulse trains representative of numerical quantities in decade time intervals arranged in ascending powers of the denary radix, comprising a plurality of input channels for a plurality of pulses simultaneously applied to all said channels, a delay line having a number of input taps and an electrical length not exceeding the time interval of a pulse period, a plurality of tubes having control grids connected to said plurality of input channels and plates connected to said input taps, a two decade counter including units and tens counters, said delay line having an output circuit connected to an actuation input of said two decade counter, an auxiliary decade counter, means for transferring at each decade time interval the count of said tens counter to said units counter and the count of said units counter to said auxiliary counter, means for also resetting in each decade time interval said auxiliary counter by the application on its actuation input of pulses marking the pulse periods of said computer, an output channel under control of said counters including means for deriving said resetting pulses and for delaying them by a time interval equal to a major cycle less a minor cycle before their reapplication on one of said input channels, a multistage step-by-step register of decimal digits, each of said tubes except the tube connected to said resetting output also comprising a grid controlled by a register stage, and further means for applying to the input of said register, at consecutive major cycle time intervals the number representative pulse train corresponding to successive digits of ascending powers of the denary radix of the multiplicand; and means for applying to said input channels except the resetting channel the complete multiplier representative train at each recurrent major cycle until the decimal digits in the multiplicand representative train are exhausted.

14. Combination according to claim 13 comprising a coincidence circuit having two input circuits and one output circuit, means for applying to one of said input circuits reference pulses and to the other of said input circuits said multiplicand train as derived from said input channels for counting the decimal digits of said train, and means under control of said output circuit to stop application of the multiplier as soon as the decimal digits in the multiplicand train as counted by said coincidence circuit are exhausted.

15. In a digital electronic computer for handling denary radix number coded pulse trains representative of numerical quantities in decade time intervals arranged in ascending powers of the denary radix, means for mixing at least two predeterminedly relatively phase shifted input pulse trains, means including decade counters in cascade connection for counting in each decade time interval the number of said pulses, an auxiliary decade counter, means for transferring at the end of each decade time interval the count of a first decade counter to said auxiliary counter, and the count of a second decade counter to said first decade counter, and means for deriving from said auxiliary counter a series of predeterminedly spaced pulses representative of the decimal count in said auxiliary counter.

16. Computer according to claim 15 wherein said pulse trains are mixed with a relative shift of a value lower than the time interval of a pulse period.

17. Computer according to claim 15 wherein said counting means include at least units and tens decade counters in cascade connection.

18. Computer according to claim 15 wherein the pulses derived from said auxiliary counter are spaced by a time interval of the computer.

19. Computer according to claim 15 comprising means for converting each incoming time position coded pulse train into a number decade coded pulse train.

20. In a digital electronic computer for handling denary radix coded pulse trains representative of numerical quantities in decade time intervals arranged in ascending powers of the denary radix, decade counters in cascade connection, means for applying on the actuation input of a first decade counter a series of predeterminedly relatively phase shifted aperiodic pulses, means for counting in each decade time interval of the computer, the number of said pulses, an auxiliary decade counter, means for transferring at the end of each decade time interval the count of said first decade counter to said auxiliary counter, and the count of a second decade counter to said first decade counter, and means for deriving from said auxiliary counter a series of predeterminedly spaced pulses representative of the decimal count in said auxiliary counter.

21. Computer according to claim 20 wherein said series of pulses applied to said input are relatively shifted by a phase of less than the time interval of a pulse period in the computer.

22. Computer according to claim 20 wherein the pulses derived from the auxiliary counter are spaced by a time interval equal to a pulse period of the computer.

23. Computer according to claim 20 comprising means for delaying the pulse series derived from the auxiliary counter and for reapplying it at the input of said pulse counting means with a relative phase lead of a minor decade time interval of the computer with respect to the initiating instant of the next following major cycle of the computer.

24. Computer according to claim 20 comprising a mixer circuit having input leads, pulse trains being applied in phase relation to at least some of said input leads, delay elements in said input leads of progressively shifted values of delay not exceeding the time interval of a pulse period, and a transfer connection between the output of said mixer circuit and an actuation input of said counting means.

25. Computer according to claim 20 comprising a mixer circuit having a plurality of input and output leads and a plurality of transfer stages connecting said input leads to said output leads, number coded pulse trains being applied in phase relation to at least part of said input leads, delay elements in said output leads of progressively shifted values of delay not exceeding the time interval of a pulse period in the computer and a common transfer connection between said delayed outputs and an actuation input of said counting means.

26. Computer according to claim 20 wherein said counting means include at least a units decade counter and a tens decade counter in cascade connection and wherein at the end of each decade time interval the count of said units counter is transferred to said auxiliary counter and the count of said tens counter to said units counter.

27. Computer according to claim 20 wherein the incoming aperiodic pulses are applied in at least part of each of said decade time intervals except in their first pulse period, comprising means for resetting said first decade counter each time it delivers an actuation pulse to said tens decade counter, means for resetting said auxiliary counter each time it delivers an output pulse, delay means, and means under control of said delay means for periodically clearing said first and second counters by pulses marking the instant of beginning of the first pulse period of each decade time interval of the computer.

28. Computer according to claim 20, wherein said decade counters include a plurality of trigger stages, and transfer gates respectively controlled by the trigger stages of said second counter and having a common input circuit and output circuits including delay means in at least some of them; the delayed outputs being connected to actuation inputs of the corresponding trigger stages in said first counter, and said common input circuit being connected for the undelayed application of said pulses marking the first pulse period of each decade time interval; and wherein said auxiliary counter includes trigger stages, and transfer gates controlled respectively from the trigger stages of said first decade counter and having a common input circuit and output circuits including delay means in at least some of them; the delayed outputs being connected to actuation inputs of the corresponding trigger stages in said auxiliary counter, and said common input circuit being connected for the undelayed application of said pulses marking the instant of beginning of the first pulse period of said decade time intervals.

29. Computer according to claim 20 comprising an actuation input channel for said auxiliary counter having a trigger stage, and a transfer gate controlled by said trigger stage; and actuation input for said trigger stage from the output of said auxiliary counter, and another actuation input for said trigger stage including delay means for the delayed application of said pulses marking the first pulse period of each decade time interval of the computer, an input circuit for said transfer gate for the application of timing pulses marking pulse periods in each decade time interval, and means for deriving from the output of said transfer stage the transmitted pulses in each decade time interval of the computer.

30. Computer according to claim 20 comprising at least a four binary trigger stage units decade counter including a back-acting connection from its output to its two intermediary stages resetting said two stages at work each time an output pulse is delivered, and a four binary trigger stage tens decade counter including a resetting connection for application of reset pulses at each first pulse period of each decade time interval; said resetting connection putting to work its two intermediary stages and to rest its two extreme stages, and including a delaying element of a value lower than a pulse period of the computer; a plurality of transfer gates respectively controlled by the trigger stages from said tens counter so as to mark the count of said counter by their conductive conditions, and having their outputs delayed by a time interval lower than the preceding one and respectively connected to asymmetrical actuation inputs of the four corresponding stages of said units counter; and means for clearing said units decade counter including an input circuit for receiving the pulses marking the first pulse periods of said decade time intervals, said input circuit including means for delaying said pulses by a time interval lower than the delay introduced in the outputs of said transfer gates.

31. Computer according to claim 20 comprising an auxiliary four binary trigger stage decade counter including a resetting connection from its output to work actuation inputs of its three first trigger stages, a plurality of transfer gates respectively controlled by the trigger stages from said first decade counter so as to mark a count complementary to the count in said counter and having their outputs, the two first of which are delayed, connected to respective actuation inputs of corresponding trigger stages of said auxiliary counter in its reset condition; an actuation input for said auxiliary counter and a transfer gate in said input receiving on its input terminal pulses marking the pulse periods in the computer, and being controlled to be conducting in the work position of said trigger stage actuated to work by the pulses marking the beginning of each decade time interval of the computer and reset to rest by each pulse derived from said auxiliary counter through an output connection having a delay lower than a pulse period, said output connection being branched off at least one of the outputs of said transfer gate and auxiliary counter.

32. Computer according to claim 20 comprising a mixer having a plurality of input channels and a final output channel and including means for mixing with relative phase shifts the pulses applied on at least some of said input channels in equal phase relation; and a pulse narrowing shaper circuit in each of its input channels, said decade counters having an actuation input connected to said final output channel of said mixer.

33. Computer according to claim 20 comprising means for clearing said auxiliary counter at each decade time interval by means of pulses marking the pulse periods of said decade time interval, said clearing means including gating means controlled by the output of said auxiliary counter for stopping said clearing means when said auxiliary counter issues an output pulse.

34. In an adder device of denary radix number coded pulse trains representative of numerical quantities in decade time intervals arranged in ascending powers of the denary radix, input channels for number coded pulse trains, a decade counter including at least two cascade connected counters and controlled by said input channels and including a units and a tens main decade counters, an auxiliary decade counter, means for backwards transferring at each decade time interval of the computer the count of said units decade counter to said auxiliary counter, and the count of said tens decade counter to said units decade counter, and means for reading and resetting said auxiliary counter at each decade time interval.

35. Device according to claim 34 comprising means for resetting said auxiliary counter at each decade time interval by applying on its actuation input pulses marking the pulse periods of the computer.

36. Device according to claim 34 comprising a delay line having input taps distributed there along and a total electric length not exceeding the time interval of a pulse period of the computer, and tubes having their control grids connected to said input taps, and output terminals connected respectively to actuation inputs of said decade counters.

37. In a multiplier device of denary radix number coded pulse trains representative of numerical quantities in decade time intervals arranged in ascending powers of the denary radix, input channels for a plurality of multiplier digital pulses substantially simultaneously applied thereto, a main decade counter including at least two cascade connected counters including a units counter and a tens counter unit, an auxiliary decade counter, means for transferring backwards at each decade time interval the count of said tens counter to said units counter and the count of said units counter to said auxiliary counter, means for reading and resetting in each decade time interval said auxiliary counter, a multi-stage step-by-step register of decimal digits of the multiplicand pulse train, a time distributing arrangement, a plurality of gates controlled from said multi-stage register and individually receiving the signals from said input channels, and having their outputs connected through said time distributing arrangement to the input of said main decade counter, means for applying to said decimal digit register at consecutive major cycle time intervals the number representative pulse train corresponding to successive digits of ascending powers of the denary radix of the multiplicand, and means for applying to at least some of said input channels the complete multiplier representative train at each recurrent major cycle until the decimal digits in the multiplicand representative train are exhausted.

References Cited in the file of this patent

UNITED STATES PATENTS

| | | |
|---|---|---|
| 2,442,428 | Mumma | June 1, 1948 |
| 2,461,895 | Handy | Feb. 15, 1949 |
| 2,575,331 | Compton | Nov. 20, 1951 |
| 2,577,141 | Mauchly | Dec. 4, 1951 |
| 2,641,407 | Dickinson | June 9, 1953 |